US012737082B2

(12) United States Patent
Han

(10) Patent No.: US 12,737,082 B2
(45) Date of Patent: Sep. 15, 2026

(54) TOUCH SENSING DEVICE AND DISPLAY DEVICE INCLUDING THE SAME

(71) Applicant: LX SEMICON CO., LTD., Daejeon (KR)

(72) Inventor: Chan Hee Han, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/989,755

(22) Filed: Dec. 20, 2024

(65) Prior Publication Data

US 2025/0208738 A1 Jun. 26, 2025

(30) Foreign Application Priority Data

Dec. 22, 2023 (KR) ........................ 10-2023-0189550

(51) Int. Cl.
*G06F 3/041* (2006.01)

(52) U.S. Cl.
CPC ...... *G06F 3/04186* (2019.05); *G06F 3/04162* (2019.05)

(58) Field of Classification Search
CPC ............. G06F 3/04186; G06F 3/04162; G06F 3/0446; G06F 3/0412; G06F 3/04166; G06F 3/0448; G06F 3/03545; G06F 3/044; G06F 2203/04114
See application file for complete search history.

(56) References Cited

U.S. PATENT DOCUMENTS

2012/0313861 A1* 12/2012 Sumi ..................... G06F 3/0446 345/173
2015/0084912 A1* 3/2015 Seo ....................... G06F 3/0412 345/174
2015/0242053 A1* 8/2015 Gao .................... G06F 3/04186 345/178
2016/0239172 A1* 8/2016 Lynch ................. G06F 3/04883
2021/0191599 A1* 6/2021 Lim ........................ G06F 3/044

FOREIGN PATENT DOCUMENTS

KR 10-2015-0065999 A 6/2015
KR 10-2021-0078079 A 6/2021

* cited by examiner

*Primary Examiner* — Jonathan A Boyd
(74) *Attorney, Agent, or Firm* — POLSINELLI PC

(57) ABSTRACT

A touch sensing device includes a sensor configured to receive sensing values from a plurality of touch electrodes arranged in an active area; a coordinate calculator configured to calculate touch coordinates based on the sensing values; and a data generator configured to generate virtual touch data in a non-active area outside an edge area of the active area when a touch is detected in the edge area of the active area.

20 Claims, 12 Drawing Sheets

FIG. 4

| | X0 | X1 | X2 | X3 | X4 | X5 | X6 |
|---|---|---|---|---|---|---|---|
| Y0 | 0 | 1 | -1 | 0 | -2 | -1 | 1 |
| Y1 | 2 | 0 | 0 | -1 | -1 | 0 | 1 |
| Y2 | -1 | -1 | 0 | 1 | 17 | -1 | -2 |
| Y3 | 0 | 2 | 1 | 20 | 41 | 22 | 0 |
| Y4 | -2 | -1 | 8 | 35 | 83 | 44 | 10 |
| Y5 | -1 | -1 | 0 | 16 | 38 | 19 | 0 |
| Y6 | -1 | -1 | 0 | 1 | 13 | 1 | -1 |

FIG. 5A

| | X2 | X3 | X4 | X5 | X6 | SUM |
|---|---|---|---|---|---|---|
| X Sum | 8 | 71 | 192 | 85 | 10 | 366 |
| Weighted X Sum | 16 | 213 | 768 | 425 | 60 | 1482 |

| | Y2 | Y3 | Y4 | Y5 | Y6 | SUM |
|---|---|---|---|---|---|---|
| Y Sum | 17 | 83 | 180 | 73 | 13 | 366 |
| Weighted X Sum | 34 | 249 | 720 | 326 | 78 | 1446 |

| | X0 | X1 | X2 | X3 | X4 |
|---|---|---|---|---|---|
| Y0 | -2 | 0 | 2 | 0 | -1 |
| Y1 | 2 | 6 | 18 | 7 | -1 |
| Y2 | 3 | 23 | 202 | 23 | 3 |
| Y3 | 2 | 10 | 26 | 8 | 3 |
| Y4 | -2 | 2 | 2 | 1 | -1 |

FIG. 8B

| | X0 | X1 | X2 | X3 | X4 |
|---|---|---|---|---|---|
| Y0 | 1 | 2 | 1 | 2 | -1 |
| Y1 | -1 | 5 | 18 | 7 | 1 |
| Y2 | 2 | 17 | 69 | 15 | -1 |
| Y3 | 0 | 5 | 11 | 4 | 1 |
| Y4 | 2 | 2 | 2 | 1 | 1 |

FIG. 8C

| | X0 | X1 | X2 | X3 | X4 |
|---|---|---|---|---|---|
| Y0 | -1 | -1 | 0 | 1 | -1 |
| Y1 | 1 | 3 | 15 | 5 | 1 |
| Y2 | 1 | 18 | 150 | 25 | 3 |
| Y3 | 1 | 5 | 25 | 8 | 2 |
| Y4 | 0 | 0 | 2 | 1 | 1 |

FIG. 9

| X1 | X2 | X3 | | | |
|---|---|---|---|---|---|
| | 0 | 1 | 1 | 2 | Y2 |
| e1 | 16 | 7 | 0 | 1 | Y3 |
| e2 | 79 | 14 | 2 | 0 | Y4 |
| e3 | 15 | 6 | 2 | 1 | Y5 |
| | 1 | 0 | 1 | 0 | Y6 |

FIG. 10

| X1 | X2 | X3 | | | |
|---|---|---|---|---|---|
| | 0 | 0 | 1 | 2 | Y2 |
| e1 | 18 | 6 | 0 | 1 | Y3 |
| e2 | 124 | 19 | 2 | 0 | Y4 |
| e3 | 20 | 7 | 2 | 1 | Y5 |
| | 1 | 0 | 1 | 0 | Y6 |

FIG. 11

| | Ideal (X,Y) | a=22,b=32 | a=16,b=32 | a=20,b=32 |
|---|---|---|---|---|
| Pen1 | 2.5, 4.5 | 2.50, 4.51 | 2.38, 4.51 | 2.56, 4.51 |
| Pen2 | 2.5, 4.5 | 2.66, 4.49 | 2.49, 4.49 | 2.58, 4.49 |
| Pen3 | 2.5, 4.5 | 2.59, 4.51 | 2.45, 4.51 | 2.51, 4.51 |

| X1 | X2 | X3 | | | |
|---|---|---|---|---|---|
| | 0 | 1 | 1 | 2 | Y2 |
| e1 | 24 | 7 | 0 | 1 | Y3 |
| e2 | 185 | 22 | 2 | 0 | Y4 |
| e3 | 26 | 8 | 2 | 1 | Y5 |
| | 1 | 0 | 1 | 0 | Y6 |

FIG. 14

| X1 | X2 | X3 | | | |
|---|---|---|---|---|---|
| | 0 | 1 | 1 | 2 | Y2 |
| e1 | 16 | 7 | 0 | 1 | Y3 |
| e2 | 79 | 14 | 2 | 0 | Y4 |
| e3 | 15 | 6 | 2 | 1 | Y5 |
| | 1 | 0 | 1 | 0 | Y6 |

FIG. 15

| X1 | X2 | X3 | | | |
|---|---|---|---|---|---|
| | 0 | 0 | 1 | 2 | Y2 |
| e1 | 18 | 6 | 0 | 1 | Y3 |
| e2 | 124 | 19 | 2 | 0 | Y4 |
| e3 | 20 | 7 | 2 | 1 | Y5 |
| | 1 | 0 | 1 | 0 | Y6 |

FIG. 16

| | Ideal | a=22,b=32,c=-29 |
|---|---|---|
| Pen1 | 2.5, 4.5 | 2.50, 4.51 |
| Pen2 | 2.5, 4.5 | 2.49, 4.49 |
| Pen3 | 2.5, 4.5 | 2.51, 4.51 |

FIG. 17

| Average Touch Sensitivity | a | b |
|---|---|---|
| 380 | 22 | 32 |
| 200 | 16 | 32 |
| 310 | 20 | 32 |

TOUCH SENSING DEVICE AND DISPLAY DEVICE INCLUDING THE SAME

CROSS-REFERENCE TO RELATED APPLICATION

This application claims the priority of Korean Patent Application No. 10-2023-0189550, filed Dec. 22, 2023, which is hereby incorporated by reference in its entirety.

BACKGROUND

Field of the Disclosure

The aspects of the present disclosure relate to a touch sensing device and a display device including the same.

Description of the Background

As the information society develops, demand for display devices for displaying images has been increasing in various forms. Recently, various types of display devices, such as liquid crystal display (LCD) devices and organic light emitting display (OLED) devices, are being utilized.

In Recent, display devices equipped with touchscreen panels that may detect touch input by a user's finger or stylus pen, departing from conventional input methods such as buttons, keyboards, and mice, are widely used. Such display devices equipped with touchscreen panels include touch sensing devices for accurately detecting the presence of touch and touch coordinates.

Generally, while a touch sensing device may relatively accurately sense touched portions within a touch area, it has a problem in that accurate sensing is difficult for portions touched in an edge area, which is the periphery of the touch area, due to insufficient sensing data.

Additionally, when a user uses various stylus pens, since each stylus pen has different touch sensitivity, it becomes more difficult to calculate accurate coordinates in the edge area.

SUMMARY

The present disclosure is to provide a touch sensing device capable of accurately calculating touch coordinates in edge areas.

The present disclosure is also to provide a touch sensing device capable of accurately calculating touch coordinates in edge areas even when the type of pen changes.

The present disclosure is not limited to those mentioned above, and other features not mentioned will be clearly understood by those skilled in the art from the following description.

According to one aspect of the present disclosure, a touch sensing device includes: a sensor configured to receive sensing values from a plurality of touch electrodes arranged in an active area; a coordinate calculator configured to calculate touch coordinates based on the sensing values; and a data generator configured to generate virtual touch data in a non-active area outside an edge area when touch is detected in the edge area of the active area.

The coordinate calculator may calculate the touch coordinates in the edge area using touch data sensed in the edge area and the virtual touch data generated in the non-active area.

The data generator may generate the virtual touch data using touch data adjacent to the non-active area for each row.

The touch sensing device may further include: a touch sensitivity measurement part configured to measure average touch sensitivity of a pen contacting the active area, wherein the data generator generates the virtual touch data by adjusting values of touch data sensed in the edge area based on the average touch sensitivity of the pen.

The average touch sensitivity may vary depending on a type of the pen, and the data generator may generate different virtual touch data depending on the type of the pen.

The touch data sensed in the edge area may vary depending on a type of the pen, and the touch coordinates calculated in the edge area using the touch data sensed in the edge area and the virtual touch data generated in the non-active area may output same coordinate values regardless of the type of the pen.

The data generator may generate virtual touch data (ED) in the non-active area according to the following equation:

$$ED = d - \left(d1 + \left(d \times (a - \beta)/b\right)\right) \quad \text{[Equation]}$$

where d is touch data of an outermost sensing area adjacent to the non-active area, d1 is touch data of a first sensing area closest to the outermost sensing area in a first direction, a and b are optimal coefficients, and β is a value obtained by dividing predetermined average touch data of a touch area by optimal coefficient c.

According to aspects of the present disclosure, touch coordinates in edge areas may be accurately calculated.

Additionally, touch coordinates in edge areas may be accurately calculated even when the type of pen changes.

The effects of the present disclosure are not limited to the effects mentioned above, and other effects not mentioned may be clearly understood by those skilled in the art from the claims.

BRIEF DESCRIPTION OF THE DRAWINGS

The above and other features and advantages of the present disclosure will become more apparent to those of ordinary skill in the art by describing exemplary aspects thereof in detail with reference to the attached drawings, in which:

FIG. 4 is a drawing illustrating an example of touch data calculated by a coordinate calculator;

FIGS. 5A and 5B are drawings illustrating a method of calculating touch coordinates by the coordinate calculator;

FIGS. 8A to 8C are drawings illustrating different states of touch data according to pen types;

FIG. 9 is a drawing illustrating an example of calculating touch data when an edge area is touched with a second pen;

FIG. 10 is a drawing illustrating an example of calculating touch data when an edge area is touched with a third pen;

FIG. 11 is a drawing illustrating different optimal coefficients that adjust calculated touch coordinates to approach ideal touch coordinates according to pen types;

FIG. 14 is a drawing for explaining a process of generating virtual touch data when an edge area is touched with a second pen;

FIG. 15 is a drawing for explaining a process of generating virtual touch data when an edge area is touched with a third pen;

FIG. 16 is a drawing illustrating a state where touch coordinates remain constant even when the type of pen changes;

FIG. 17 is a drawing illustrating a state where optimal coefficients are differently adjusted according to average touch sensitivity.

DETAILED DESCRIPTION

Figure 1:
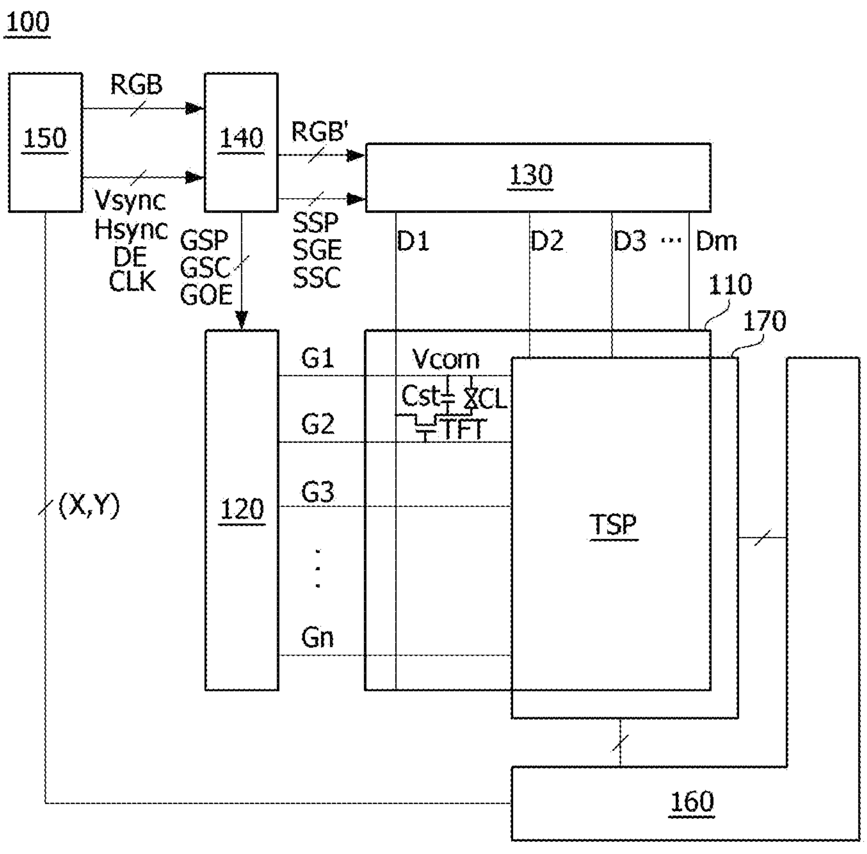
FIG. 1 is a drawing illustrating a display device including a touch sensing device according to an aspect of the present disclosure.

The advantages and features of the present disclosure, and methods of achieving them will be apparent from the aspects described in detail below in conjunction with the accompanying drawings. However, the present disclosure is not limited to the following aspects, which may be implemented in various different forms; rather, the present aspects are provided to make the disclosure of the present disclosure complete and to allow those skilled in the art to fully understand the scope of the present disclosure, and the present disclosure is defined only within the scope of the appended claims.

The shapes, sizes, proportions, angles, numbers and the like shown in the accompanying drawings for the purpose of describing the aspects of the present disclosure are merely examples, and the present disclosure is not limited thereto. Like reference numerals generally denote like elements throughout the present specification. Further, in describing the present disclosure, detailed descriptions of known related technologies may be omitted so as not to unnecessarily obscure the subject matter of the present disclosure.

The terms such as "comprising," "including," "having," and "consisting of" used herein are generally intended to allow other components to be added unless the terms are used with the term "only." References to the singular shall be construed to include the plural unless expressly stated otherwise.

In interpreting components, they are construed to include a margin of error, even if it is not explicitly stated.

When describing a positional or interconnected relationship between two components, such as "on top of," "above," "below," "next to," "connect or couple with," "crossing," "intersecting," etc., one or more other components may be interposed between them unless "immediately" or "directly" is used.

When describing a temporal contextual relationship is described, such as "after," "following," "next to," or "before," it may not be continuous on a time scale unless "immediately" or "directly" is used.

First, second, and the like may be used before the names of the components to distinguish the components, but the function or structure thereof is not limited by such ordinal number or component name. For ease of description, the ordinal numbers placed before the names of the same components may differ between aspects.

The following aspects may be combined or associated with each other in whole or in part, and various types of interlocking and driving are technically possible. The aspects may be implemented independently of each other or together in an interrelated relationship.

Hereinafter, various aspects of the present disclosure will be described in detail with reference to the accompanying drawings.

Figure 2:
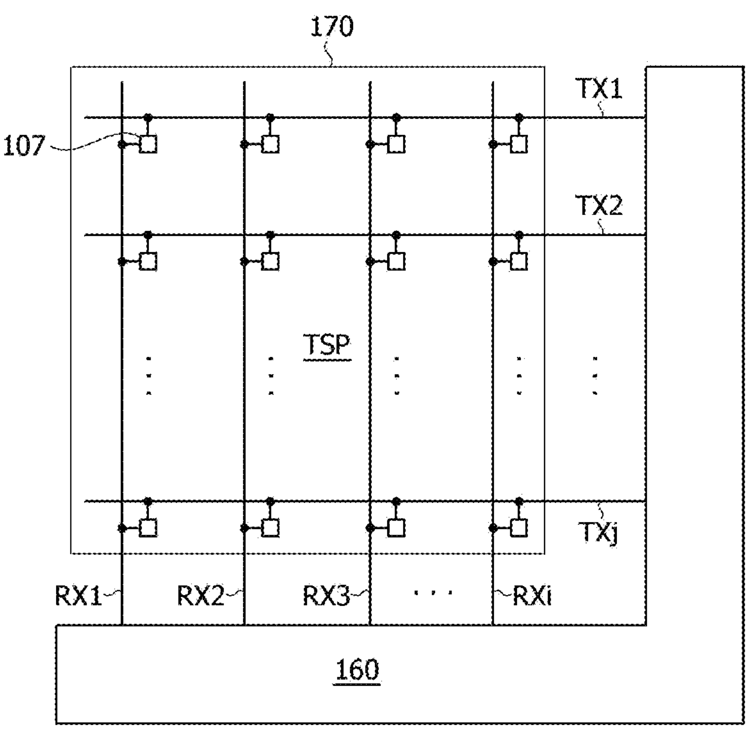
FIG. 2 is a drawing illustrating a touch sensing device according to an aspect of the present disclosure.

FIG. 1 is a drawing illustrating a display system including a touch sensing device according to an aspect of the present disclosure. FIG. 2 is a drawing illustrating a touch sensing device according to an aspect of the present disclosure.

Referring to FIG. 1, a display device includes a display panel 110, a gate driver 120, a data driver 130, a timing controller 140, a touch screen panel TSP 170, and a touch sensing device 160, and a display system 100 may further include a host system 150 that supplies various timing signals to the timing controller 140 of the display device.

The display panel 110 includes a plurality of gate lines G1-Gn and data lines D1-Dm, which are arranged to cross each other, to define a plurality of pixel areas, and pixels (P) provided in each of the pixel areas.

A thin film transistor TFT supplies a source signal provided through the data lines D1-Dm to pixels in response to scan pulses supplied through the gate lines G1-Gn.

The gate driver 120 includes a shift register that sequentially generates scan pulses, i.e., gate high pulses, according to a gate control signal GCS. The thin film transistor TFT is turned on in response to these scan pulses.

The gate driver 120 may be disposed on one side of the display panel 110, for example, the left side as shown, but may be disposed on both opposing sides, for example, both left and right sides. The gate driver 120 may include multiple gate driver ICs (Integrated Circuits, not shown).

The gate driver 120 may be implemented in the form of a tape carrier package (TCP) with gate driver ICs mounted thereon, but is not limited thereto, and the gate driver ICs may be directly mounted on the display panel 110.

The data driver 130 converts digital video signals transmitted from the timing controller 140 to analog source signals and outputs them to the display panel 110. Specifically, the data driver 130 outputs analog source signals to the data lines D1-Dm in response to data control signals DCS transmitted from the timing controller 140.

The data driver 130 may be disposed on one side of the display panel 110, for example, the top side, but may be disposed on both opposing sides, for example, both top and bottom sides. Additionally, the data driver 130 may be implemented in the form of a tape carrier package with mounted source driver ICs, but is not limited thereto.

In one aspect, the data driver 130 may include multiple source driver ICs (not shown) that convert digital video signals transmitted from the timing controller 140 to analog source signals and output them to the display panel 110.

The timing controller 140 receives various timing signals including vertical sync signal Vsync, horizontal sync signal Hsync, data enable signal DE, clock signal CLK, etc. from the host system 150, and generates data control signals DCS for controlling the data driver 130 and gate control signals GCS for controlling the gate driver 120. Additionally, the timing controller 140 receives video signals RGB from the host system 150 and converts them to video signals RGB' that may be processed by the data driver 130.

The data control signals DCS may include source start pulse SSP, source sampling clock SSC, source output enable signal SOE, etc., and the gate control signals GCS may include gate start pulse GSP, gate shift clock GSC, gate output enable signal GOE, etc.

The host system 150 may be implemented as any one of a navigation system, set-top box, DVD player, Blu-ray player, personal computer (PC), home theater system, broadcast receiver, or phone system.

The host system 150 includes a system on chip (SoC) with a built-in scaler and converts digital video data RGB of input images to a format suitable for display on the display panel 110. The host system 150 transmits digital video data RGB and timing signals to the timing controller 140.

The host system 150 analyzes touch coordinates X, Y input from the touch sensing device 160 to output touch coordinates in line form on the display panel 110, or executes applications associated with coordinates where touch has occurred by the user.

Referring to FIG. 2, the touchscreen panel 170 may include touch driving lines (TX1-TXj, where j is a natural number of 2 or more), multiple touch electrodes 107, and touch sensing lines (RX1-RXi, where i is a natural number of 2 or more) that transmit voltages (or charges) of the touch electrodes 107.

Each touch electrode 107 includes mutual capacitance. The touch sensing lines RX1-RXi may refer to sensing lines of the touchscreen panel 170. In one aspect, the touchscreen panel 170 may be implemented as either disposed on or embedded in the display panel 110. For example, the touchscreen panel 170 may be arranged in on-cell type or in-cell type on the display panel 110. However, it is not limited this, and various known structures may be applied to the touchscreen panel structure.

The touch sensing device 160 senses touches occurring on the touchscreen panel 170. In one aspect, the touch sensing device 160 may drive the touch electrodes 107 by supplying touch driving signals through the touch driving lines TX1-TXj, and sense changes in capacitance that occur when the touch electrodes 107 are touched through the touch sensing lines RX1-RXi.

The touch sensing device 160 calculates touch raw data (TRD) based on the detected capacitance changes and calculates touch coordinates based on the calculated touch raw data.

The touch sensing device 160 may calculate touch data for each touch electrode 107 based on the touch raw data, set touch labels for touch electrodes where the calculated touch data is greater than or equal to a threshold, and then calculate touch coordinates for each touch label.

The touch sensing device 160 transmits touch coordinates X, Y for touch inputs determined to be normal touches to the host system 150.

Figure 3:
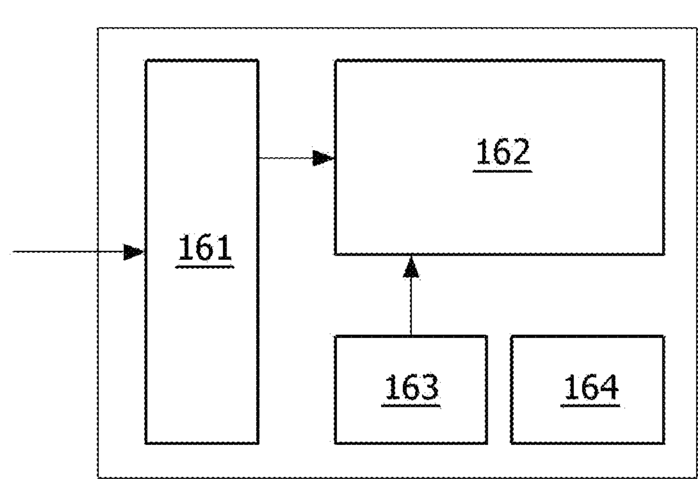
FIG. 3 is a block diagram schematically showing a configuration of the touch sensing device according to the aspect of the present disclosure.

FIG. 3 is a block diagram schematically showing a configuration of a touch sensing device according to an aspect of this disclosure. FIG. 4 is a drawing illustrating an example of touch data calculated by a coordinate calculator. FIGS. 5A and 5B are drawings illustrating a method of calculating touch coordinates by the coordinate calculator.

Referring to FIG. 3, according to an aspect, the touch sensing device 160 includes a sensor 161, a coordinate calculator 162, a data generator 163, and a memory 164. The sensor 161, coordinate calculator 162, data generator 163, and memory 164 may be integrated into a single integrated circuit (IC).

The sensor 161 selects touch sensing channels to receive voltages from touch electrodes, and receives voltages (sensing values) from the touch electrodes through touch sensing lines RX1-RXi connected to the selected touch sensing channels. The sensor 161 samples voltages received through the touch sensing lines RX1-RXi and accumulates them in an integrator (not shown). The sensor 161 may input the voltage accumulated in the integrator to an analog-to-digital converter (ADC, not shown) to convert it to digital data, namely touch raw data (TRD), for output.

The coordinate calculator 162 calculates touch coordinates based on touch raw data (TRD) input from the sensor 161. The coordinate calculator 162 may compare the received touch raw data with reference data to calculate differences, and calculate these differences as touch intensity for each touch electrode. In one aspect, the coordinate calculator 162 may set an average value of touch raw data acquired from n frames as reference data. Here, the n frames may be set as the first n frames after power-on of the display system.

The coordinate calculator 162 may execute a labeling algorithm that assigns the same identification (ID) to touch electrodes whose calculated touch intensity within one frame is greater than or equal to a predetermined label threshold. The coordinate calculator 162 may calculate touch coordinates based on touch data of each touch electrode included in one touch label.

Referring to FIGS. 4, 5A and 5B, the coordinate calculator 162 may calculate the sum of touch data for each X coordinate from touch data larger than the reference data, and calculate the total sum, X_Sum, of touch data. Subsequently, it may calculate a weighted total sum, Weighted X_Sum, by multiplying the sum of touch data for each X coordinate by its respective X coordinate value.

Thereafter, X coordinates may be calculated by dividing the weighted total sum, Weighted X_Sum, by the total sum of touch data, X_Sum, and adding a correction coefficient. When the weighted total sum, Weighted X_Sum, is 1482, the total sum of touch data, X_Sum, is 366, and the correction coefficient is set to 0.5, the X coordinate may be calculated as 4.549 ($X=1482/366+0.5=4.549$).

Y coordinates may be calculated in the same way as X coordinates. The sum of touch data for each Y coordinate may be calculated to obtain the total sum of touch data, Y_Sum. Subsequently, the weighted total sum, Weighted Y_Sum, may be calculated by multiplying the sum of touch data for each Y coordinate by its respective Y coordinate value.

Then, Y coordinates may be calculated by dividing the weighted total sum, Weighted Y_Sum, by the total sum of touch data, Y_Sum, and adding a correction coefficient. When the weighted total sum, Weighted Y_Sum, is 1446, the total sum of touch data, Y_Sum, is 366, and the correction coefficient is set to 0.5, the Y coordinate may be calculated as 4.451 ($Y=1446/366+0.5=4.451$).

However, it is not limited to this, and touch coordinates may be calculated using various methods of calculating the center of gravity.

Figure 6:
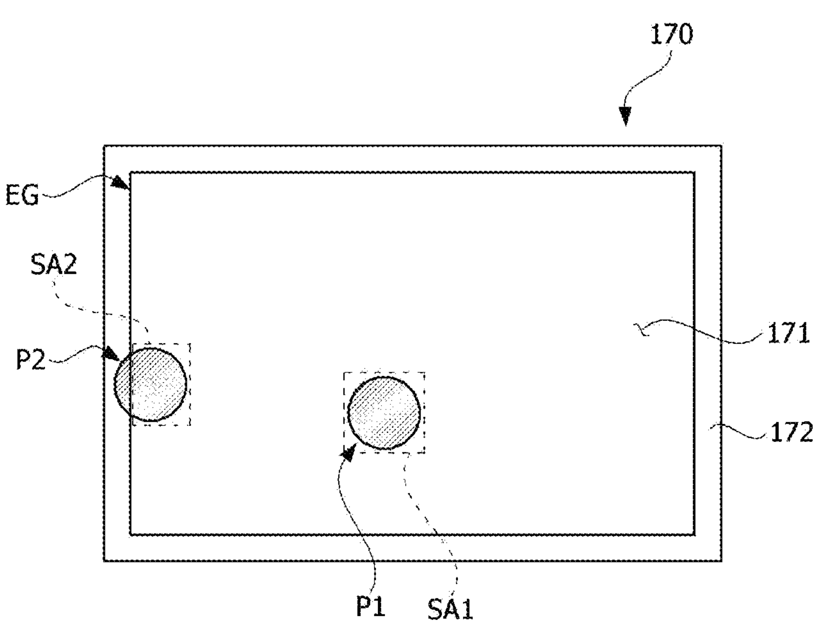
FIG. 6 is a drawing illustrating states when a center area and an edge area of a touchscreen panel are touched.
Figure 7:
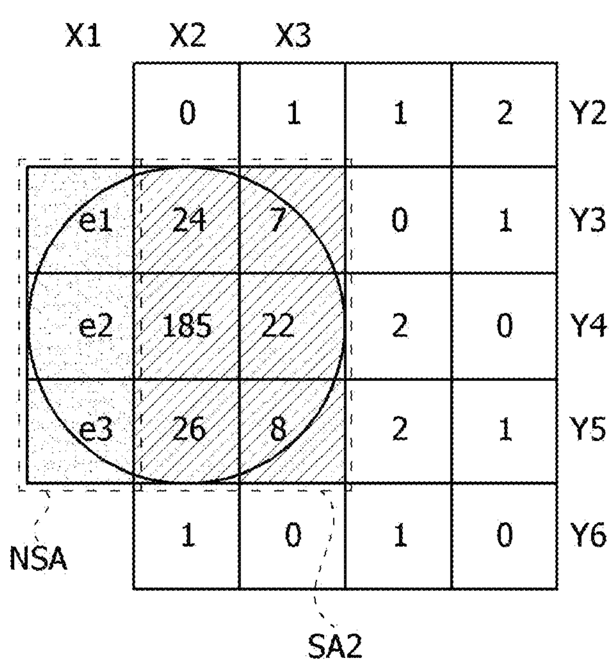
FIG. 7 is a drawing illustrating an example of calculating touch data when the edge area is touched with a first pen.

FIG. 6 is a drawing illustrating states when a center area and an edge area of a touchscreen panel are touched. FIG. 7 is a drawing illustrating an example of calculating touch data when the edge area is touched with a first pen.

Referring to FIG. 6, within the active area 171 of the touchscreen panel 170, the actual touch size P1 and the sensing size SA1 may be the same. Here, the actual touch size P1 refers to the size of the area touched by a touch object, and the sensing size SA1 refers to the size of the touch area sensed by touch sensors.

In contrast, coordinate values of touched areas sensed in the edge area EG of the touchscreen panel may be calculated inaccurately. This is because while portions touched in the edge area is detected of the active area 171, portions touched in the bezel area 172 (non-active area) cannot be sensed. Therefore, when the edge area is touched, the size of the edge sensing area SA2 is smaller compared to the actual touch size P2. Consequently, when the edge area is touched, the calculated coordinate of center of gravity may be inaccurate due to insufficient data.

Referring to FIG. 7, according to the aspect, when the edge area is touched, the touch sensing device may generate virtual touch data e1, e2, and e3 in a non-active area NSA outside the edge area. Therefore, even when the edge area is touched, accurate touch coordinates may be calculated since the actual touch size and sensing size become similar.

The coordinate calculator 162 of the touch sensing device may first determine whether the touch point is in the active area or in the edge area. It may determine that the edge area has been touched when touch data is output at the outermost coordinates of the active area, when touch data at the outermost coordinates is greater than or equal to a predetermined value, or when touch data at the outermost coordinates is greater than touch data at adjacent coordinates.

Referring to FIG. 7, it may be determined that the edge area has been touched because the touch data at coordinate X2, which is the outermost sensing area in the sensing area SA2, is greater than the touch data at coordinate X3. However, the configuration for determining whether it is an edge area is not limited thereto, and various edge detection algorithms may be applied without limitation.

The data generator 163 may generate virtual touch data in the non-active area NSA outside the edge area when the edge area is touched. The data generator 163 may set the number and position of non-active areas NSA symmetrical to the edge sensing area SA2 with the outermost coordinate X2 as an axis, and generate virtual touch data for the non-active area NSA. With this configuration, accurate coordinate calculation becomes possible since sufficient sensing data may be secured as if the actual touch area was touched.

The data generator 163 may generate virtual touch data (ED) according to the following equation 1:

$$ED = d - \left(d1 + (d \times a)/b\right) \qquad \text{[Equation 1]}$$

Here, d is touch data of the outermost sensing area, d1 is touch data of a first sensing area closest to the outermost sensing area in a first direction, and a and b are optimal coefficients. The first direction may be a direction from the non-active area NSA where virtual data will be generated toward the edge sensing area SA2.

The optimal coefficient a may be 22, and the optimal coefficient b may be 32. The values of optimal coefficients a and b may be pre-calculated values that yield results closest to ideal coordinate values of the touch area. For example, when touch data as shown in FIG. 7 is detected at a position with ideal X, Y coordinate of (2.5, 4.5), a and b that yield values closest to the coordinate (2.5, 4.5) when calculated using equation 1 may be selected as optimal coefficients.

Referring to FIG. 7, the virtual touch data e1 of the first non-active area may be calculated as 0.5 by substituting into Equation 1, i.e., 24−(7+(24×22)/32)=0.5. Here, d may be 24, which is the touch data at coordinate X2, and d1 may be 7, which is the touch data at coordinate X3.

Additionally, the virtual touch data e2 of the second non-active area may be calculated as 35.81, i.e., 185−(22+(185×22)/32)=35.81, and the virtual touch data e3 of the third non-active area may be calculated as −0.13, i.e., 26−(8+(26×22)/32)=−0.13.

The coordinate calculator 162 may calculate the coordinate of center of gravity using six sensing touch data points from the edge area and three virtual touch data points e1, e2, and e3. Therefore, the problem of inaccurate touch coordinates in the edge area due to insufficient sensing data may be resolved.

FIGS. 8A to 8C are drawings illustrating different states of touch data according to pen types. FIG. 9 is a drawing illustrating an example of calculating touch data when an edge area is touched with a second pen. FIG. 10 is a drawing illustrating an example of calculating touch data when an edge area is touched with a third pen. FIG. 11 is a drawing illustrating different optimal coefficients that adjust calculated touch coordinates to approach ideal touch coordinates according to pen types.

When the touch object is a stylus pen (hereinafter referred to as a pen) rather than a user's finger, touch sensitivity may vary depending on the type of the pen. Pen manufacturers have different hardware for their pens, and physical pressure magnitude, driving voltage, etc. may all differ according to manufacturing specs. Therefore, when various pens touch the same touchscreen panel, touch data may differ for each pen since the magnitude of sensed voltage differs.

For example, as shown in FIG. 8A, the largest touch data in the touch area may be 202 for the first pen; as shown in FIG. 8B, it may be 69 for the second pen; and as shown in FIG. 8C, it may be 150 for the third pen. That is, even when touching the same point, the average sensitivity differs for each pen. While higher touch data average magnitude may indicate higher touch sensitivity, this is not necessarily limited thereto.

As a result, even if optimal coefficients a and b are calculated according to the sensitivity of the first pen as shown in FIG. 7, when using the second or third pen with different sensitivity, accurate virtual touch data for that pen cannot be generated, making it impossible to accurately calculate the coordinate of center of gravity in the edge area.

When calculating pitch as one (1), the maximum error may be around 0.16, and typical pitch when using a pen may be about 4 mm. Therefore, the maximum error becomes 0.64 mm, and accuracy may decrease further when including jitter and noise components.

Referring to FIG. 9, when the edge area is touched with the second pen, different touch data may be detected compared to the first pen. Therefore, for the second pen with different sensitivity, coefficients a and b must be reset to apply Equation 1.

According to the touch data in the edge area, for the second pen, the optimal coefficient a that yields values closest to the ideal coordinate may be 16, and optimal coefficient b may be 32. Therefore, according to Equation 1, the virtual touch data e1 of the first non-active area may be calculated as: 16−(7+(16×16)/32)=1. Additionally, the virtual touch data e2 of the second non-active area may be calculated as: 79−(14+(79×16)/32)=25.5. Also, the virtual touch data e3 of the third non-active area may be calculated as: 15−(6+(15×16)/32)=1.5.

Additionally, referring to FIG. 10, when the edge area is touched with the third pen, touch data different from both the first and second pens may be detected. For the third pen with different sensitivity, the optimal coefficient a that yields values closest to the ideal coordinate may be 20, and optimal coefficient b may be 32. Therefore, according to Equation 1, the virtual touch data e1 of the first non-active area may be calculated as: 18−(6+(18×20)/32)=0.75. Additionally, the virtual touch data e2 of the second non-active area may be calculated as: 124−(19+(124×20)/32)=27.5. Also, the virtual touch data e3 of the third non-active area may be calculated as: 20−(7+(20×20)/32)=0.5.

Referring to FIG. 11, since the optimal coefficient values a and b differ according to the type of first through third pens pen1, pen2, pen3, accurate coordinate calculation becomes possible for each pen when using the optimal coefficients a and b appropriate for the respective pen. However, when the type of pen changes while the optimal coefficients a and b are fixed, touch coordinate accuracy in the edge area may decrease.

Figures 12, 13:
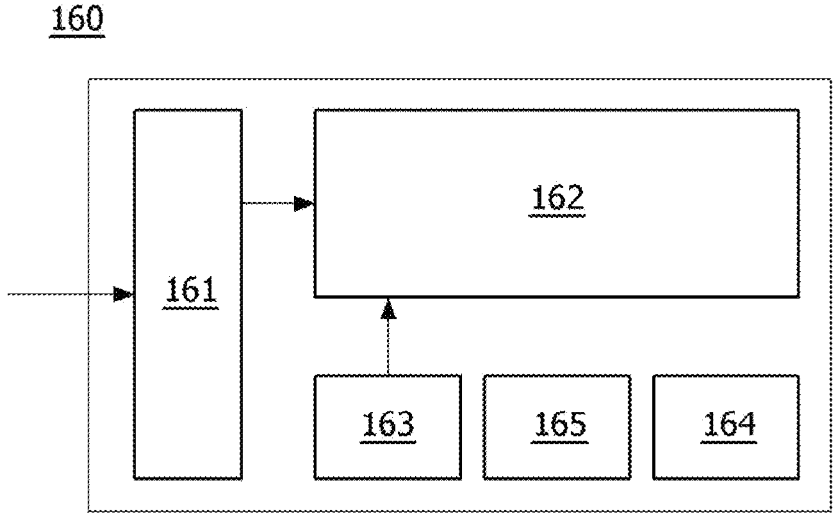
FIG. 12 is a block diagram schematically showing a configuration of a touch sensing device according to another aspect of the present disclosure.
FIG. 13 is a drawing for explaining a process of generating virtual touch data when an edge area is touched with a first pen.

FIG. 12 is a block diagram schematically showing a configuration of a touch sensing device according to another aspect of the present disclosure.

Referring to FIG. 12, the touch sensing device includes a sensor 161, a coordinate calculator 162, a data generator 163, an average sensitivity measurement part 165, and a memory 164.

The coordinate calculator 162 may first determine whether the touched area is in the active area or in the edge area. When the touched area is in the active area, the coordinate of center of gravity may be calculated using touch data as described above.

However, it may be determined that the edge area has been touched when touch data is output at the outermost coordinates of the active area, when touch data at the outermost coordinates is greater than or equal to a predetermined value, or when touch data at the outermost coordinates is greater than touch data at adjacent coordinates. However, various known edge detection algorithms may be applied for the method of determining whether a touch point is in the edge area.

The data generator 163 may generate virtual touch data in the non-active area NSA outside the edge area when the edge area is touched. The data generator 163 may set the number and position of non-active areas NSA symmetrical to the edge sensing area with the outermost coordinates as an axis, and generate virtual touch data for each set non-active area NSA. With this configuration, accurate coordinate calculation becomes possible as sufficient sensing data may be secured as if the actual touch area was touched.

The data generator 163 may generate virtual touch data (ED) in the edge area according to the following equation 2:

$$ED = d - \left(d1 + \left(d \times (a - \beta)/b\right)\right) \quad \text{[Equation 2]}$$

Here, d is touch data of the outermost sensing area, d1 is touch data of a first sensing area closest to the outermost sensing area in a first direction, a and b are optimal coefficients, and β is a value obtained by dividing predetermined average touch data of the touch area by optimal coefficient c. The fixed coefficient c may be a value calculated such that a−β approaches the optimal coefficient a of Equation 1.

The optimal coefficients a, b, and c in Equation 2 may be pre-calculated values that may yield optimal coordinate values. As an example, optimal coefficient a may be 9, b may be 32, and c may be −29, although not limited thereto.

According to Equation 2, there is an advantage that calculation of touch coordinates in edge area remains consistent even when touch sensitivity changes depending on the pen being used.

The average sensitivity measurement part 165 may periodically measure the average touch sensitivity of the central area of the touchscreen panel. For example, it may measure touch data in a 3×3 size touch area in the central area and store their average value as the average touch sensitivity. However, the area for measuring touch sensitivity is not necessarily limited thereto, and may be any predetermined area that may accurately measure touch data according to pen type without particular limitation.

FIG. 13 is a drawing for explaining a process of generating virtual touch data when an edge area is touched with a first pen. FIG. 14 is a drawing for explaining a process of generating virtual touch data when an edge area is touched with a second pen. FIG. 15 is a drawing for explaining a process of generating virtual touch data when an edge area is touched with a third pen. FIG. 16 is a drawing illustrating a state where touch coordinates remain constant even when the type of pen changes.

As shown in FIG. 13, touch data may be detected when an edge area is touched with the first pen. At this time, the average touch sensitivity measured by the average sensitivity measurement part 165 may be 380. Therefore, β may be approximately −13 since it is 380/−29. The data generator 163 may generate virtual touch data using Equation 2.

Substituting these values into Equation 2, the virtual touch data e1 of the first non-active area may be calculated as: 24−(7+(24×(9+13))/32)=0.5. Here, d is 24, which is the touch data at coordinate X2, being the touch data of the outermost sensing area, and d1 is 7, which is the touch data at coordinate X3, being the touch data of a first sensing area closest to the outermost sensing area in a first direction. At this time, (a−β) may be 22, which is the same value as the optimal coefficient a for the first pen (refer to FIG. 11).

Additionally, the virtual touch data e2 of the second non-active area may be calculated as: 185−(22+(185×(9+13))/32)=35.81, and the virtual touch data e3 of the third non-active area may be calculated as: 26−(8+(26×(9+13))/32)=−0.13.

For example, the average touch sensitivity may be 380 for the first pen. Therefore, the first through third virtual touch data e1, e2, and e3 may be similar to the virtual touch data for the first pen calculated in FIG. 7.

As shown in FIG. 14, when an edge area is touched with the second pen, different touch data may be detected compared to the first pen. At this time, in Equation 2, a may be 9, b may be 32, and c may be −29, as in the previous case. The average touch sensitivity measured by the average sensitivity measurement part 165 in the central area may be 200. Therefore, β may be approximately −7 since it is 200/−29. The data generator 163 may generate virtual touch data according to Equation 2.

Substituting these values into Equation 2, the virtual touch data e1 of the first non-active area may be calculated as: 16−(7+(16×(9+7))/32)=1. At this time, (a−β) may be 16, which is the same value as the optimal coefficient a for the second pen.

Additionally, the virtual touch data e2 of the second non-active area may be calculated as: 79−(14+(79×(9+7))/32)=25.5, and the virtual touch data e3 of the third non-active area may be calculated as: 15−(6+(15×(9+7))/32)=1.5.

For example, the average touch sensitivity may be 200 for the second pen. Therefore, the virtual touch data of the first through third virtual touch areas e1, e2, and e3 may be similar to the virtual touch data for the second pen calculated in FIG. 9.

As shown in FIG. 15, when an edge area is touched with the third pen, touch data different from both the first and second pens may be detected. At this time, the average touch sensitivity measured by the average sensitivity measurement part 165 in the central area may be 310. Therefore, β may be approximately −11 since it is 310/−29. When the edge area is touched, the data generator 163 may generate virtual touch data according to Equation 2.

When substituting the above values into Equation 2, the virtual touch data e1 of the first non-active area may be calculated as 18−(6+(18×(9+11))/32)=0.75. In this case, (a−β) may be equal to 20, which is the same as the optimal coefficient a of the third pen.

Furthermore, the virtual touch data e2 of the second non-active area may be calculated as 124−(19+(124×(9+11))/32)=27.5, and the virtual touch data e3 of the third non-active area may be calculated as 20−(7+(20×20)/32)=0.5.

For example, in the case of the third pen, the average touch sensitivity may be 310. Therefore, the first to third virtual touch data e1, e2, and e3 may be similar to the virtual touch data of the third pen calculated in FIG. 10.

According to the aspect, it may be seen that accurate calculation of edge coordinate is possible using any of the first pen, second pen, or third pen having different touch sensitivities, by means of the equations adjusted according to each pen's touch sensitivity.

Referring to FIG. 16, in the case of the first pen, Pen 1, second pen, Pen 2, and third pen, Pen 3, when fixed values are set for optimal coefficients a, b, and c and virtual touch data is generated using equation 2, then using this to calculate the coordinate of center of gravity, it may be seen that coordinates similar to actual coordinates may be calculated for all cases. FIGS. 13, 14, and 15 show touch data obtained when a point with the actual coordinate of (2.5, 4.5) is touched with each pen, and when calculating their coordinates of center of gravity, it may be seen that they have values similar to the actual coordinate (2.5, 4.5).

Therefore, it may be seen that accurate touch coordinates in edge areas may be calculated even when the pen type changes by including the average touch sensitivity that varies according to pen type as an adjustment coefficient.

FIG. 17 is a drawing illustrating a state where optimal coefficients are differently adjusted according to average touch sensitivity.

Referring to FIG. 17, the memory 164 of the touch sensing device may store optimized coefficients a and b in the form of a lookup table according to average touch sensitivity. For example, when the average touch sensitivity is 380, optimal coefficient a may be set to 22 and b to 32 to obtain coordinates similar to ideal coordinates; when the average touch sensitivity is 200, optimal coefficient a may be set to 16 and b to 32; and when the average touch sensitivity is 310, optimal coefficient a may be set to 20 and b to 32.

When an edge area is detected, the data generator 163 may select coefficients a and b from the lookup table according to the average touch sensitivity measured by the average sensitivity measurement part 165, and substitute these coefficients a and b into Equation 1 to generate virtual touch data. Therefore, accurate virtual touch data may be secured by changing optimal coefficients even when the pen type changes.

The coordinate calculator 162 may calculate touch coordinates in the edge area using the generated virtual touch data and measured sensing data.

Figure 18:
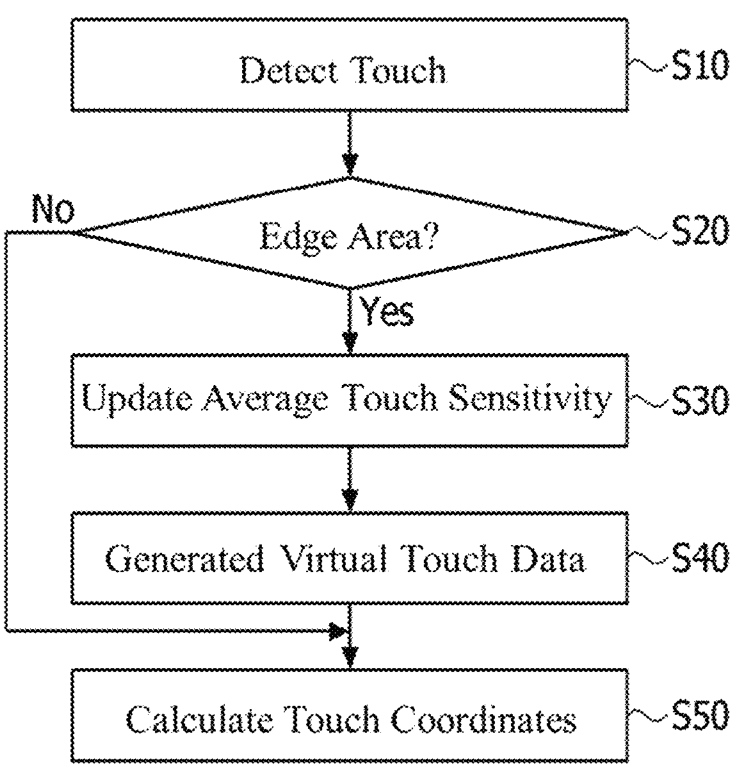
FIG. 18 is a flowchart illustrating a touch sensing method according to an aspect of the present disclosure.

FIG. 18 is a flowchart illustrating a touch sensing method according to an aspect of the present disclosure.

Referring to FIG. 18, the touch sensing method according to the aspect includes the steps of: detecting touch (S10), determining whether it is an edge area (S20), updating average touch sensitivity (S30), generating virtual touch data (S40), and calculating touch coordinates (S50).

The step of detecting touch (S10) selects touch sensing channels to receive voltages from touch electrodes and receives voltages from the touch electrodes through touch sensing lines RX1-RXi connected to the selected touch sensing channels.

Subsequently, voltages received through the touch sensing lines RX1-RXi are sampled and accumulated in an integrator (not shown), and the accumulated voltage in the integrator is input to an analog-to-digital converter to generate touch raw data.

The step of determining whether in an edge area (S20) may determine that an edge area has been touched when touch data is input at the outermost coordinates of the touch area, when touch data at the outermost coordinates is greater than or equal to a predetermined value, or when touch data at the outermost coordinates is greater than touch data at adjacent coordinates. However, various known edge detection algorithms may be applied for the method of determining whether a touch point is in the edge area.

The step of updating average touch sensitivity (S30) periodically monitors touch data in the central area of the touchscreen panel to measure average touch sensitivity, and may update the average touch sensitivity when an edge area is detected. The average touch sensitivity may vary depending on the pen type.

The step of generating virtual touch data (S40) may generate virtual touch data in the non-active area NSA outside the edge area when the edge area is touched.

First, the number and position of non-active areas NSA symmetrical to the edge area are set with the outermost coordinates as an axis, and virtual touch data may be generated for each set non-active area NSA. With this configuration, accurate coordinate calculation becomes possible as sufficient sensing data may be secured.

Virtual touch data may be generated according to Equation 2 described above. According to the aspect, by including average touch sensitivity that varies according to pen type as an adjustment coefficient, accurate touch coordinates in edge areas may be calculated even when the pen type changes.

The step of calculating touch coordinates (S50) calculates center of gravity using the sensed touch data and generated virtual touch data.

The step of calculating touch coordinates may include calculating a sum of touch data for each X coordinate and calculating a total sum of touch data, X_Sum. Subsequently, a total sum of weighted touch data, Weighted X_Sum, may be obtained by multiplying each sum of touch data for each X coordinate by its corresponding X coordinate value.

Then, an X coordinate may be calculated by dividing the total sum of weighted touch data, Weighted X_Sum, by the total sum of touch data, X_Sum, and adding a correction coefficient. A Y coordinate may also be calculated using the same method as described above.

The descriptions of the problem to be solved, the means to solve the problem, and the effect described above does not specify the essential features of the claims, and therefore the scope of the claims is not limited by what is described in the specification.

Although the aspects have been described in more detail with reference to the accompanying drawings, the present disclosure is not necessarily limited to such aspects, and may be variously modified within the scope thereof without departing from the technical spirit of the present disclosure. Therefore, the aspects disclosed in the present disclosure are provided for illustrative purposes only and are not intended to limit the technical concept of the present disclosure, and the scope of the technical concept of the present disclosure is not limited thereto. Thus, it is intended that the present disclosure covers the modifications and variations of the aspects provided they come within the scope of the appended claims and their equivalents.

What is claimed is:

1. A touch sensing device, comprising:

a sensor configured to receive sensing values from a plurality of touch electrodes arranged in an active area;

a coordinate calculator configured to calculate touch coordinates based on the sensing values; and a data generator configured to generate virtual touch data in a non-active area outside an edge area when a touch is detected in the edge area of the active area, wherein the sensing values comprise touch data obtained from the plurality of touch electrodes, wherein the data generator is configured to generate the virtual touch data as touch data values corresponding to the positions located outside the active area based on touch data of an outermost sensing area adjacent to a non-active area and touch data of a first sensing area closest to the outermost sensing area in a first direction, and wherein the coordinate calculator is configured to calculate the touch coordinates based on a dataset including both the sensing values obtained from the plurality of touch electrodes and the virtual touch data corresponding to the positions located outside the active area.

2. The touch sensing device of claim 1, wherein the coordinate calculator calculates the touch coordinates in the edge area using touch data sensed in the edge area and the virtual touch data generated in the non-active area.

3. The touch sensing device of claim 1, wherein the data generator generates the virtual touch data using touch data adjacent to the non-active area for each row.

4. The touch sensing device of claim 1, further comprising a touch sensitivity measurement part configured to measure average touch sensitivity of a pen contacting the active area, wherein the data generator generates the virtual touch data by adjusting values of touch data sensed in the edge area based on the average touch sensitivity of the pen.

5. The touch sensing device of claim 4, wherein the average touch sensitivity varies depending on a type of the pen, and the data generator generates different values of the virtual touch data depending on the type of the pen.

6. The touch sensing device of claim 4, wherein the touch data sensed in the edge area varies depending on a type of the pen, and the touch coordinates calculated in the edge area using the touch data sensed in the edge area and the virtual touch data generated in the non-active area output same coordinate values regardless of the type of the pen.

7. The touch sensing device of claim 1, wherein the data generator generates the virtual touch data, ED, in the non-active area according to the following equation 1:

$$ED = d - \left(d1 + (d \times a)/b\right) \qquad \text{[Equation 1]}$$

where d is touch data of an outermost sensing area adjacent to the non-active area, d1 is touch data of a first sensing area closest to the outermost sensing area in a first direction, a and b are coefficients.

8. The touch sensing device of claim 1, wherein the data generator generates the virtual touch data, ED, in the non-active area according to the following equation 2:

$$ED = d - \left(d1 + \left(d \times (a - \beta)/b\right)\right) \qquad \text{[Equation 2]}$$

where d is touch data of an outermost sensing area adjacent to the non-active area, d1 is touch data of a first sensing area closest to the outermost sensing area in a first direction, a and b are coefficients, and β is a value obtained by dividing predetermined average touch data of a touch area by optimal coefficient c.

9. The touch sensing device of claim 1, wherein the coordinate calculator determines that the edge area has been touched when touch data at the outermost coordinates is greater than or equal to a predetermined value, or when touch data at the outermost coordinates is greater than touch data at adjacent coordinates.

10. The touch sensing device of claim 8, further comprising a memory storing the coefficients a and b.

11. A display device, comprising:

a touchscreen panel; and a touch sensing device configured to detect touch on the touchscreen panel, wherein the touch sensing device includes:

a sensor configured to receive sensing values from a plurality of touch electrodes arranged in an active area of the touchscreen panel;

a coordinate calculator configured to calculate touch coordinates based on sensing data from the sensor; and a data generator configured to generate virtual touch data in a non-active area outside an edge area when a touch is detected in the edge area of the touchscreen panel, wherein the sensing values comprise touch data obtained from the plurality of touch electrodes, wherein the data generator is configured to generate the virtual touch data as touch data values corresponding to the positions located outside the active area based on touch data of an outermost sensing area adjacent to a non-active area and touch data of a first sensing area closest to the outermost sensing area in a first direction, and wherein the coordinate calculator is configured to calculate the touch coordinates based on a dataset including both the sensing values obtained from the plurality of touch electrodes and the virtual touch data corresponding to the positions located outside the active area.

12. The display device of claim 11, wherein the coordinate calculator calculates the touch coordinates in the edge area using touch data sensed in the edge area and the virtual touch data generated in the non-active area.

13. The display device of claim 11, wherein the data generator generates the virtual touch data using touch data adjacent to the non-active area for each row.

14. The display device of claim 11, further comprising a touch sensitivity measurement part configured to measure average touch sensitivity of a pen contacting the active area, wherein the data generator generates the virtual touch data by adjusting values of touch data sensed in the edge area based on the average touch sensitivity of the pen.

15. The display device of claim 14, wherein the average touch sensitivity varies depending on a type of the pen, and the data generator generates different values of the virtual touch data depending on the type of the pen.

16. The display device of claim 14, wherein the touch data sensed in the edge area varies depending on a type of the pen, and the touch coordinates calculated in the edge area using the touch data sensed in the edge area and the virtual touch data generated in the non-active area output same coordinate values regardless of the type of the pen.

17. The display device of claim 11, wherein the data generator generates the virtual touch data, ED, in the non-active area according to the following equation 1:

$$ED = d - \left(d1 + (d \times a)/b\right) \quad \text{[Equation 1]}$$

where d is touch data of an outermost sensing area adjacent to the non-active area, d1 is touch data of a first sensing area closest to the outermost sensing area in a first direction, a and b are coefficients.

18. The display device of claim 11, wherein the data generator generates the virtual touch data, ED, in the non-active area according to the following equation 2:

$$ED = d - \left(d1 + \left(d \times (a - \beta)/b\right)\right) \quad \text{[Equation 2]}$$

where d is touch data of an outermost sensing area adjacent to the non-active area, d1 is touch data of a first sensing area closest to the outermost sensing area in a first direction, a and b are coefficients, and β is a value obtained by dividing predetermined average touch data of a touch area by optimal coefficient c.

19. The display device of claim 11, wherein the coordinate calculator determines that the edge area has been touched when touch data at the outermost coordinates is greater than or equal to a predetermined value, or when touch data at the outermost coordinates is greater than touch data at adjacent coordinates.

20. The display device of claim 18, further comprising a memory storing the coefficients a and b.

* * * * *